United States Patent [19]
Allard

[11] 3,831,859
[45] Aug. 27, 1974

[54] DISCHARGE MEANS FOR AGRICULTURAL FOAM

[75] Inventor: Gordon H. Allard, Menomonee Falls, Wis.

[73] Assignee: Waukesha Foundry Company, Inc., Waukesha, Wis.

[22] Filed: Oct. 19, 1972

[21] Appl. No.: 298,890

[52] U.S. Cl.................. 239/592, 239/601, 47/1.7
[51] Int. Cl............................................ B05b 1/04
[58] Field of Search.......................... 239/592–595, 239/597, 598, 601, 590.3, 176, 288; 47/1.7

[56] References Cited
UNITED STATES PATENTS

| | | | |
|---|---|---|---|
| 659,862 | 10/1900 | Stone | 239/592 X |
| 2,151,090 | 3/1939 | Drill | 239/597 |
| 3,009,529 | 11/1961 | Brown | 239/597 X |
| 3,383,054 | 5/1968 | Nugarus | 239/592 X |
| 3,436,022 | 4/1969 | Ernst | 239/597 X |

FOREIGN PATENTS OR APPLICATIONS

| | | | |
|---|---|---|---|
| 1,566,395 | 5/1969 | France | 239/288 |

Primary Examiner—M. Henson Wood, Jr.
Assistant Examiner—John J. Love
Attorney, Agent, or Firm—Wheeler, Morsell, House & Fuller

[57] ABSTRACT

A group of nozzles for discharging foam to cover a surface completely, in which foam is supplied to the nozzle at right angles to the discharge direction and at a substantial distance from any side or end wall of the nozzle to promote uniform pressure and flow. In addition, an improved nozzle support has a lost motion connection to permit the nozzle to follow the surface, secured with a pin for easy changing of the lateral position, the nozzle being slidable on a pair of beams for vertical and axial adjustment. Plows are provided to cover the edges of the foam with dirt. Sideboards shelter the emerging foam from the wind until it is deposited.

8 Claims, 12 Drawing Figures

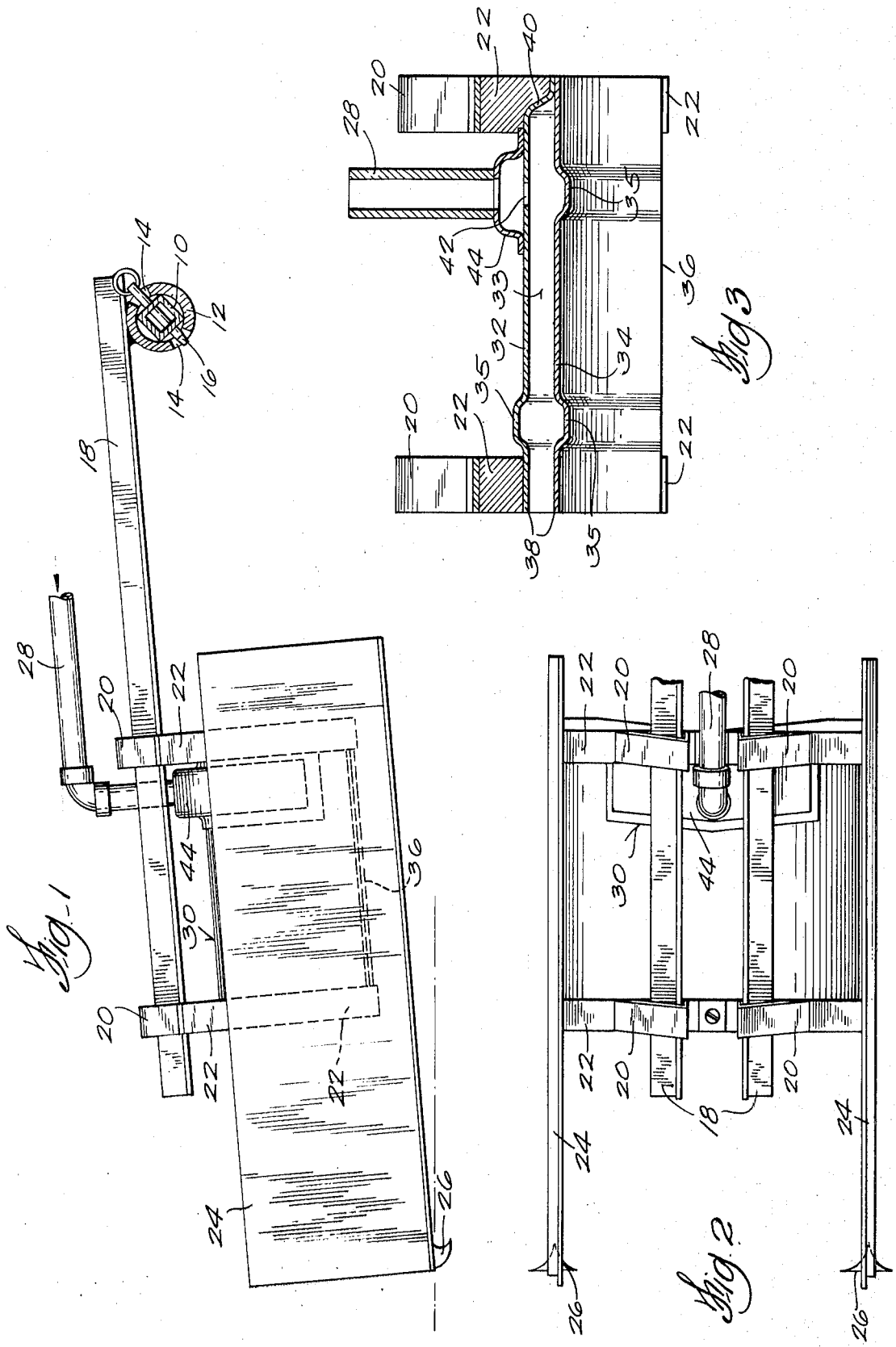

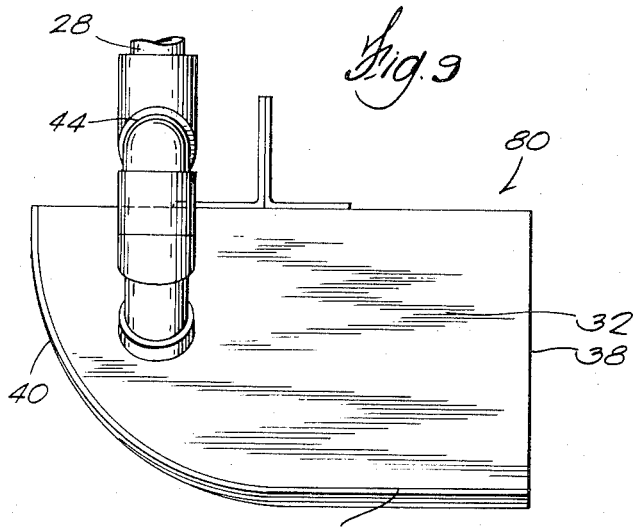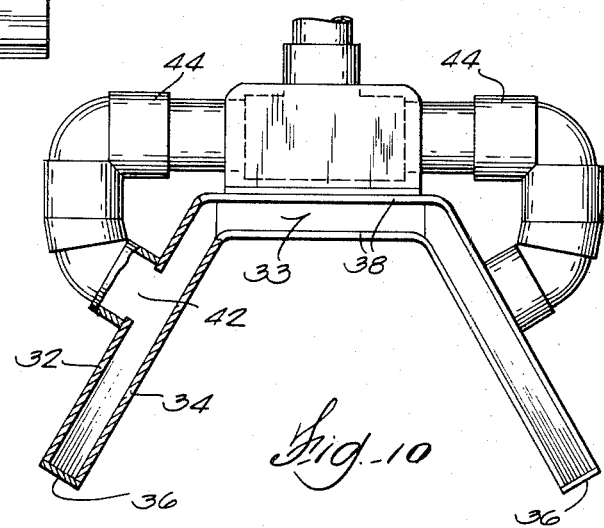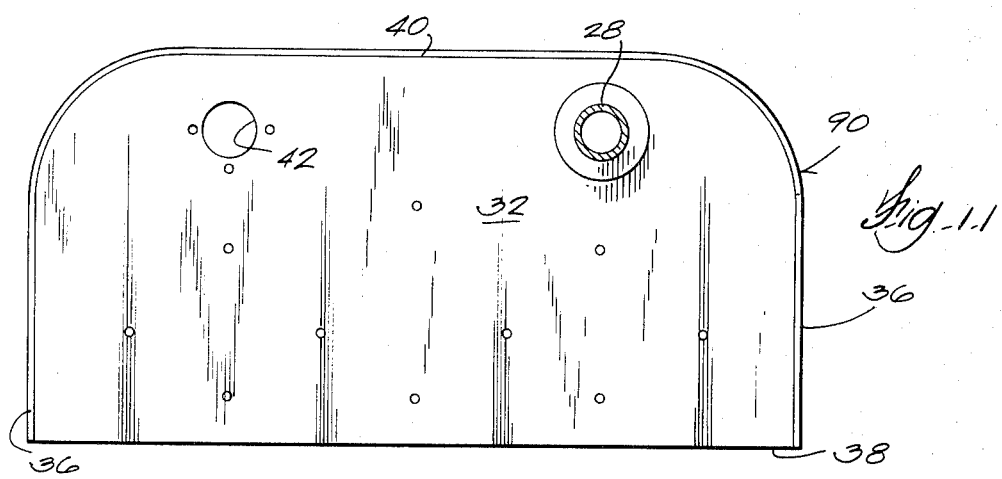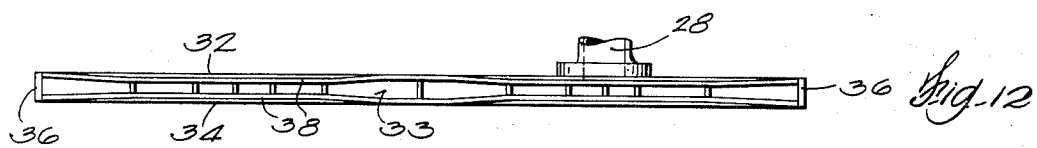

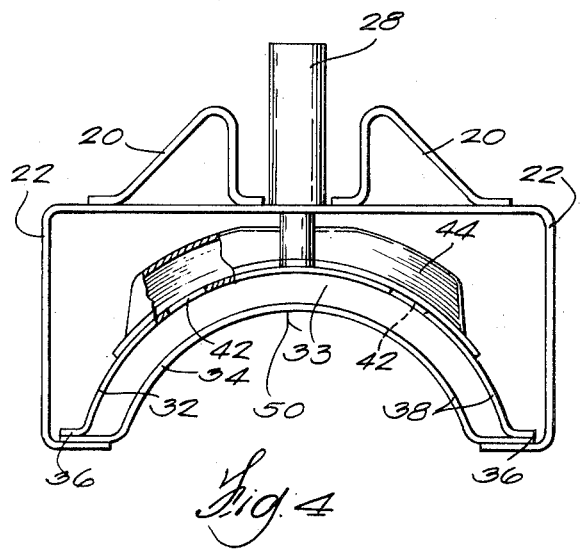
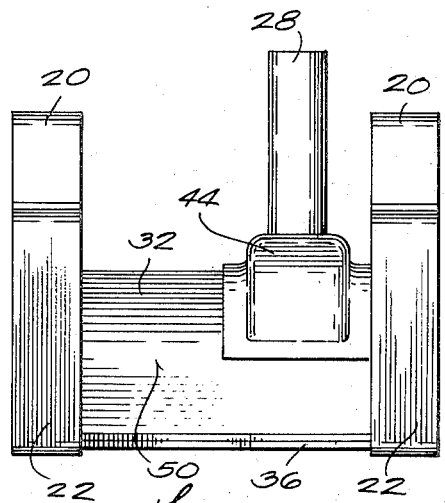
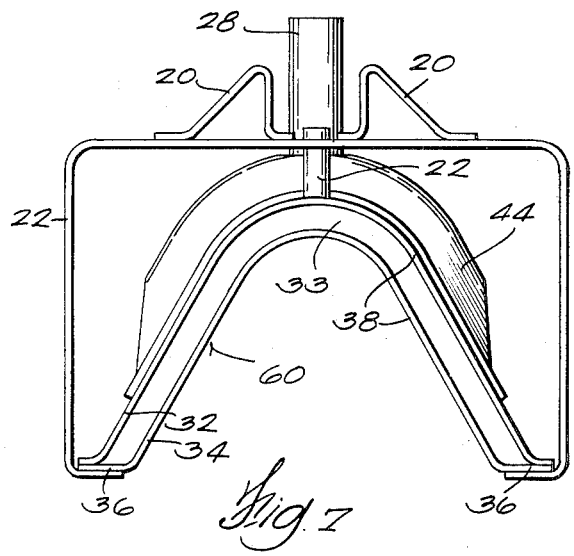
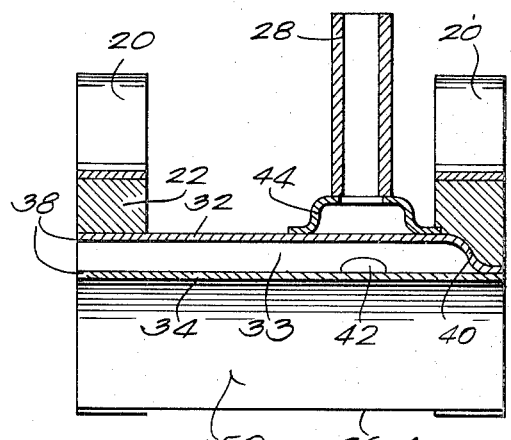
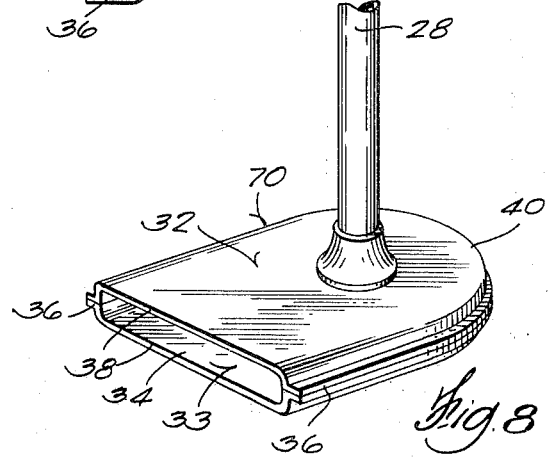

3,831,859

DISCHARGE MEANS FOR AGRICULTURAL FOAM

BACKGROUND OF THE INVENTION

For many purposes it is desirable to cover an object or surface completely with foam. Among such purposes are agricultural uses such as those in which the foam may contain a gaseous crop treatment, or may be intended to insulate the crop against freezing or flame weeding. For any such use it is required that the foam be as unbroken as possible. Unbroken foam requires even flow from the nozzle. Known prior art nozzles are deficient in this regard, particularly in the larger sizes. The closest known patent for a foam nozzle is British patent 1,007,304. Other known patents show devices which spray liquids or distribute a gas and are less pertinent.

SUMMARY OF THE INVENTION

I discovered that for emitting a blanket of foam from a nozzle, the combination of feeding the foam into the nozzle at right angles to the discharge direction, and placing the entry port for the foam at a distance from the size and end walls of the nozzle, produce a smooth flow due to substantially equal flow resistance between the passages supplying the foam and various points along the outlet lips at the open side of the nozzle. In all but the largest nozzles the discharge opening may then have parallel lips, which are easily formed and need no adjustment.

I have further provided a support for my nozzle which readily allows it to follow the surface on which foam is being spread and which permits the various nozzles to be mounted easily, quickly, and securely. This mounting consists of beam retainers on a nozzle, at least one axial beam slidable through the retainer(s), a tube at the upper end of the axial beam and slidable along a transverse mounting beam of a vehicle, and a pin inserted in any of a number of holes in the transverse mounting beam and through mating holes in the tube to hold the nozzle in laterally adjusted position. Either the hole in the transverse beam or the hole in the tube (preferably the latter) is enlarged, preferably slotted, to permit vertical oscillation of the axial beams. Vertical adjustment and nozzle replacement are effected by sliding the beam retainer on the axial beam. Conventional devices (not shown) are provided to secure and release the beam retainer in adjusted position.

For added assurance of complete blanketing, a plow-like hook may be provided at each side margin of a nozzle to cover the edge of the foam blanket with dirt. Each plow is symmetrical to avoid lateral forces in the event that only one plow touches the soil. The plow may be mounted on a novel sideboard that shields the foam from wind until it is securely deposited.

DESCRIPTION

In the drawings:

FIG. 1 is a side elevational view of my nozzle and mounting.

FIG. 2 is a top view of my nozzle.

FIG. 3 is an axial cross-sectional view through a species of my nozzle.

FIG. 4 is an end elevational view of a nozzle according to my invention.

FIG. 5 is a side elevational view of the nozzle of FIG. 4.

FIG. 6 is an axial cross-sectional view of the nozzle of FIG. 4 and FIG. 5.

FIG. 7 is an end elevational view of a modified form of my nozzle.

FIG. 8 is a perspective view of a further modification.

FIG. 9 is a side view of a further modification.

FIG. 10 is an end elevational view of the nozzle of FIG. 9 with one side broken away.

FIG. 11 is a top view of a further modified nozzle with one inlet attached and one inlet detached.

FIG. 12 is an end elevational view of the nozzle of FIG. 11.

Although the following description is detailed for clarity, it is intended as illustrative rather than limiting. The scope of my invention is defined in the attached claims.

FIGS. 1 and 2 show one of my foam nozzles mounted with my mounting and including side boards and edge covering plows. The mounting, which is applicable to a wide variety of foam nozzles, is mounted on a lateral member 10 of some other piece of equipment such as an agricultural vehicle carrying a foam generator, by means of a tube 12 around lateral member 10. Tube 12 is provided with aligned slots or openings 14 which are substantially larger than pin 16. Pin 16 extends through openings 14 into tube 12 and through closely fitting openings in lateral member 10, to permit a lost motion connection between the lateral member and the tube for vertical movement of the mounting in response to vertical movements of the foam spreading device caused by changes in the terrain. Preferably a plurality of holes for pin 16 are provided in lateral member 10, although holes 14 may also be multiplied to provide for movement of tube 12 laterally with respect to beam 10 so that the lateral position of the foam nozzle may be adjusted and secured with pin 16. Either group of holes may be larger, as long as vertical oscillation may occur. Tube 12 is provided with a parallel pair of beams 18 extending rearwardly and somewhat downwardly toward the ground.

Each of my foam spreading nozzles which is intended to be mounted behind the agricultural vehicle is provided with two pairs of aligned beam receiving guides or retainers 20. In the form shown the beams are angle irons and the beam receiving guides 20 are triangular metal enclosures of a size to receive the angle iron beam 18. Any conventional securing device, such as a set screw, may be used in a guide 20 to secure the nozzle to beam 18. As shown, guides 20 are mounted on supports 22 secured in any conventional way to a foam nozzle such as nozzle 30.

In the form shown in FIGS. 1 and 2, a pair of side boards 24 are secured to the sides of supports 22. These boards protect the foam released from nozzle 30 from the wind and each may be provided at its lower corner with a plow 26 which, as best shown in FIG. 2, is desirably symmetrical. Plow 26 throws up a small ridge of earth against the edge of the blanket of foam released from nozzle 30 to insure good contact between the edge of the foam blanket, which may be relatively stiff, and the ground. If plow 26 is symmetrical a single plow will not generate side forces tending to pull nozzle 30 out of the axial path it is following behind the agricultural vehicle when one plow 26 touches the ground due to irregularities. Conduit 28 supplies foam to nozzle 30 from a foam generating pump or other foam generator not shown.

FIG. 3 shows one species of my foam spreading nozzle in greater detail. Nozzle 30 consists generally of an upper plate 32 and a lower plate 34 which are joined in any convenient fashion at their side margins 36 and which terminate at one end at spaced lips or edges 38 which are substantially parallel from one margin 36 to the other side margin 36 to define an opening through which foam may escape in a blanket having the shape defined by lips 38. Supports 22 may desirably extend under side margins 36 for support. The other end wall 40 of the chamber 33 between upper plate 32 and lower plate 34 may be an extension of one of the plates joining the other of the plates.

Conduit 28 is connected to chamber 33 by at least one port 42 spaced a substantial distance from end wall 40 so that foam enters chamber 33 at right angles to the plane of the chamber defined by plates 32 and 34 and spreads out in all directions before being forced by end wall 40 and side walls 36 to flow towards lips 38. This structure causes a uniform flow to emerge all along lips 38 to form a blanket of foam because the flow paths to the lips each have about the same resistance to flow of the foam. If the nozzle 30 is moved at the proper speed in relation to the amount of foam delivered through conduit 28 and the foam is properly supported by whatever it is being deposited on, voids or gaps in the coverage of the foam blanket are unlikely.

In the device shown in FIG. 3, the arched shape of the nozzle 30 is such that a single port 42 is not sufficient. Accordingly a distributor 44 receives the foam from conduit 28 and extends laterally to a number of ports 42 spaced along distributor 44, each discharging at right angles to the plane of chamber 33 at the particular port 42. If desired, stiffening ribs 35 in the form of channels extending transversely of plates 32 and 34 may be provided. Such channels are believed to perform the additional function of smoothing the flow of foam through lips 38, possibly by improving the lateral distribution of the foam within chamber 33. The locations of ports 42 should equalize the portion of lips 38 served by each and manifold or distributor 44 should supply foam at equal volume and pressure to each port 42. Path lengths from ports 42 to various parts of lips 38 should vary as little as possible.

The nozzle 50 shown in FIGS. 4, 5 and 6 is essentially similar except that the plane of the chamber 33 and of the lips 38 at the edges of top sheet 32 and bottom sheet 34 is essentially a semicircular arch. A pair of entrance ports 42 for foam from conduit 28 are approximately equally spaced from side margins 36 and are spaced not quite twice as far from each other. In this instance gravity is believed to require higher positions for ports 42 than are required where the chamber is more horizontal. The remainder of the parts are essentially as shown in FIGS. 1 through 3, and are identified by by similar reference characters.

Nozzle 60 of FIG. 7 is likewise essentially similar, except that the arch formed by lips 38 is straight sided, resembling an inverted V. Similar parts are identified with similar reference characters.

The nozzle 70 of FIG. 8 is a simplified version which does not require the support described with earlier modifications (although it may be used). Again similar parts have been given similar reference characters. In this modest sized version in which the foam emerges from lips 38 in a flat blanket, only a single direct entry of conduit 28 into chamber 33 is necessary. As previously described, it is spaced a substantial distance from end wall 40 and side walls 36, substantially at the center of the semicircle which is wall 40.

FIGS. 9 and 10 show a further modified nozzle 80 in which the plane of the chamber 33 and the lips 38 is essentially three sides of a hexagon. Distributor 44 takes the form of a pair of conduits extending from foam conduit 28 to a pair of ports 42. As previously described ports 42 are substantially equally spaced from sides 36 of chamber 33, and are twice as far from each other. End wall 40 is a smooth curve extending from side walls 36 to the upper portion of chamber 33 and straight across the upper portion. The foam emerges as a semi-hexagonal blanket from lips 38.

FIGS. 11 and 12 show a still further modified nozzle 90 which will produce a flat blanket of foam much wider than that which may be produced using the nozzle 70 of FIG. 8. A pair of conduits 28 are connected to the top wall 32 of chamber 33 (one conduit 28 is not shown for clarity). Ports 42 at the end of each conduit 28 permit the foam to enter chamber 33 at right angles to the plane of the chamber and at a substantial distance from back wall 40 and side walls 36. It emerges from lips 38. Because of the great lateral extent of top plate 32 and bottom plate 34 it is desirable to provide inter-connections between the plates additional to sides 36 and 40, which are spaced from lips 38. Lips 38 deviate slightly from true parallelism in the portions axially behind conduits 28 to assist in discharging an even blanket of foam. In this nozzle the end to end dimension is relatively short relative to the side to side dimension, so that some paths to lips 38 are longer than others. In such a case some minor deviations from parallel lips are permissible to smooth the flow of foam and make deposition more uniform.

What is claimed is:

1. A device for dispensing a uniform blanket of a foam of liquid and gas, comprising means for generating a said foam, a delivery passage from said generating means to a nozzle, and a nozzle for discharging said uniform blanket of a foam of liquid and gas including a foam chamber comprising spaced substantially parallel top and bottom plates, said chamber having a foam opening comprising a pair of substantially parallel laterally extending lips, said chamber having closed side walls and a closed end wall, said delivery passage supplying a gas-liquid foam to said chamber substantially at right angles to said plates through a port substantially and equally spaced not less than one diameter of said passage from a side wall and the end wall and a greater distance from said lips, whereby foam is emitted at substantially equal velocities at all points along the lips.

2. The device of claim 1 wherein the chamber and the lips are arch shaped in the lateral direction.

3. The device of claim 1 wherein the upper and lower plates forming the chamber and the lips are flat.

4. The device of claim 1 wherein said delivery passage includes a laterally extending distributor having a plurality of openings into said chamber, each said opening supplying foam to said chamber at a right angle to the portion of the plates forming the chamber about the opening.

5. A nozzle for discharging a uniform blanket of a foam of liquid and gas including a foam chamber comprising spaced substantially parallel top and bottom plates, said chamber having a foam opening comprising a pair of substantially parallel laterally extending lips, said chamber having closed side walls and a closed end wall, and means supplying foam to said chamber substantially at right angles to said plates through a port substantially spaced from the side walls, the end wall, and the lips, said nozzle being provided with means attaching it to a forwardly extending beam, a vehicle, a laterally extending beam on said vehicle, and means removably fixing said forwardly extending beam in laterally adjusted position with respect to said lateral beam, said last mentioned means including a lost motion connection between said beams shaped to permit oscillation of the forwardly extending beam around the lateral beam as an axis.

6. The device of claim 5 wherein said means fixing said forwardly extending beam in laterally adjusted position includes a lateral tube attached to the forwardly extending beam and enclosing the lateral beam; and said lost motion connection includes a pin, a hole in the lateral beam, and a hole in the tube enclosing the lateral beam, one said hole being sized to receive said pin loosely and the other said hole being sized to receive said pin closely.

7. A nozzle for discharging a uniform blanket of a foam of liquid and gas including a foam chamber comprising spaced substantially parallel top and bottom plates, said chamber having a foam opening comprising a pair of substantially parallel laterally extending lips, said chamber having closed side walls and a closed end wall, and means supplying a gas-liquid foam to said chamber substantially at right angles to said plates through a port substantially spaced from the side walls, the end wall, and the lips, and in which a flat shield substantially larger than the nozzle is held beside the nozzle in a vertical position to keep wind from disturbing the foam till it is deposited.

8. The device of claim 1 wherein one of said top and bottom plates is provided with a lateral channel open to said chamber.

* * * * *